(12) United States Patent
Tsuruta et al.

(10) Patent No.: US 9,010,694 B2
(45) Date of Patent: Apr. 21, 2015

(54) ON-BOARD TRANSPONDER DEVICE AND METHOD OF VERIFYING SOUNDNESS THEREOF

(75) Inventors: Masayuki Tsuruta, Tokyo (JP); Tomohiro Onishi, Tokyo (JP)

(73) Assignee: Mitsubishi Electric Corporation, Chiyoda-Ku, Tokyo (JP)

(*) Notice: Subject to any disclaimer, the term of this patent is extended or adjusted under 35 U.S.C. 154(b) by 484 days.

(21) Appl. No.: 13/577,069

(22) PCT Filed: Feb. 7, 2011

(86) PCT No.: PCT/JP2011/052558
§ 371 (c)(1),
(2), (4) Date: Aug. 3, 2012

(87) PCT Pub. No.: WO2011/096568
PCT Pub. Date: Aug. 11, 2011

(65) Prior Publication Data
US 2012/0292119 A1 Nov. 22, 2012

(30) Foreign Application Priority Data

Feb. 8, 2010 (JP) .................. 2010-025705

(51) Int. Cl.
*B60L 15/40* (2006.01)
*B60L 15/20* (2006.01)
*B61L 3/12* (2006.01)

(52) U.S. Cl.
CPC ...................... *B61L 3/125* (2013.01)

(58) Field of Classification Search
CPC ........... B60L 3/125; B60L 15/40; B60L 3/12; B60L 23/34; B60L 15/20
See application file for complete search history.

(56) References Cited

U.S. PATENT DOCUMENTS 1,556,633 A * 10/1925 Ruben ........................... 246/189
3,355,584 A * 11/1967 Baughman ................ 246/187 B
(Continued)

FOREIGN PATENT DOCUMENTS

| JP | 10-067324 A | 3/1998 |
| JP | 2002-101502 A | 4/2002 |

(Continued)

OTHER PUBLICATIONS

International Search Report (PCT/ISA/210) issued on Mar. 15, 2011, by the Japanese Patent Office as the International Searching Authority for International Application No. PCT/JP2011/052558.
(Continued)

*Primary Examiner* — Jason C Smith
(74) *Attorney, Agent, or Firm* — Buchanan Ingersoll & Rooney PC

(57) ABSTRACT

The present invention includes a telegraph controller and an FSK modulator that serve as a signal transmission unit that creates a checking telegraph that is different from a controlling telegraph and transmits the checking telegraph to a pickup coil, an FSK demodulator and a telegraph controller that serve as a signal reception unit that restores telegraph information from the checking telegraph received via the pickup coil, and a communication controller that compares transmission telegraph information included in a checking telegraph transmitted from the signal transmission unit with reception telegraph information restored from a received checking telegraph that includes the transmission telegraph information to verify a telegraph reception function on an on-board side.

9 Claims, 2 Drawing Sheets

(56) References Cited

U.S. PATENT DOCUMENTS

| | | | |
|---|---|---|---|
| 4,279,395 A * | 7/1981 | Boggio et al. | 246/182 R |
| 5,452,870 A * | 9/1995 | Heggestad | 246/182 R |
| 7,099,754 B2 * | 8/2006 | Sugita et al. | 701/19 |
| 2005/0133673 A1 * | 6/2005 | Sugita et al. | 246/167 R |
| 2010/0280683 A1 * | 11/2010 | Miyauchi | 701/20 |
| 2012/0166025 A1 * | 6/2012 | Tokumaru | 701/20 |
| 2012/0197466 A1 * | 8/2012 | Yoshimoto et al. | 701/20 |
| 2012/0292119 A1 * | 11/2012 | Tsuruta et al. | 178/64 |
| 2012/0320875 A1 * | 12/2012 | Ishihara | 370/331 |
| 2014/0081488 A1 * | 3/2014 | Erhard et al. | 701/20 |
| 2014/0209755 A1 * | 7/2014 | Takahashi et al. | 246/167 R |
| 2014/0209758 A1 * | 7/2014 | Kurita | 246/2 S |
| 2014/0214248 A1 * | 7/2014 | Yamada | 701/20 |

FOREIGN PATENT DOCUMENTS

| | | |
|---|---|---|
| JP | 2008-105477 A | 5/2008 |
| JP | 2009-171655 A | 7/2009 |
| JP | 2009171655 A * | 7/2009 |

OTHER PUBLICATIONS

Written Opinion (PCT/ISA/237) issued on Mar. 15, 2011, by the Japanese Patent Office as the International Searching Authority for International Application No. PCT/JP2011/052558.

Australian Office Action dated Jul. 22, 2013, issued by the Australian Patent Office in corresponding Australian Patent Application No. 2011211641. (3 pages).

Hill, R.J., "The Automation of Railways", Physics in Technology, vol. 14, Issue 37, pp. 37-47 (1983).

Hill, R.J., "Electric Railway Traction Part 5 Train Detection, Communications and Supervision", Power Engineering Journal, vol. 10, Issue 2, pp. 87-95 (Apr. 1996).

* cited by examiner

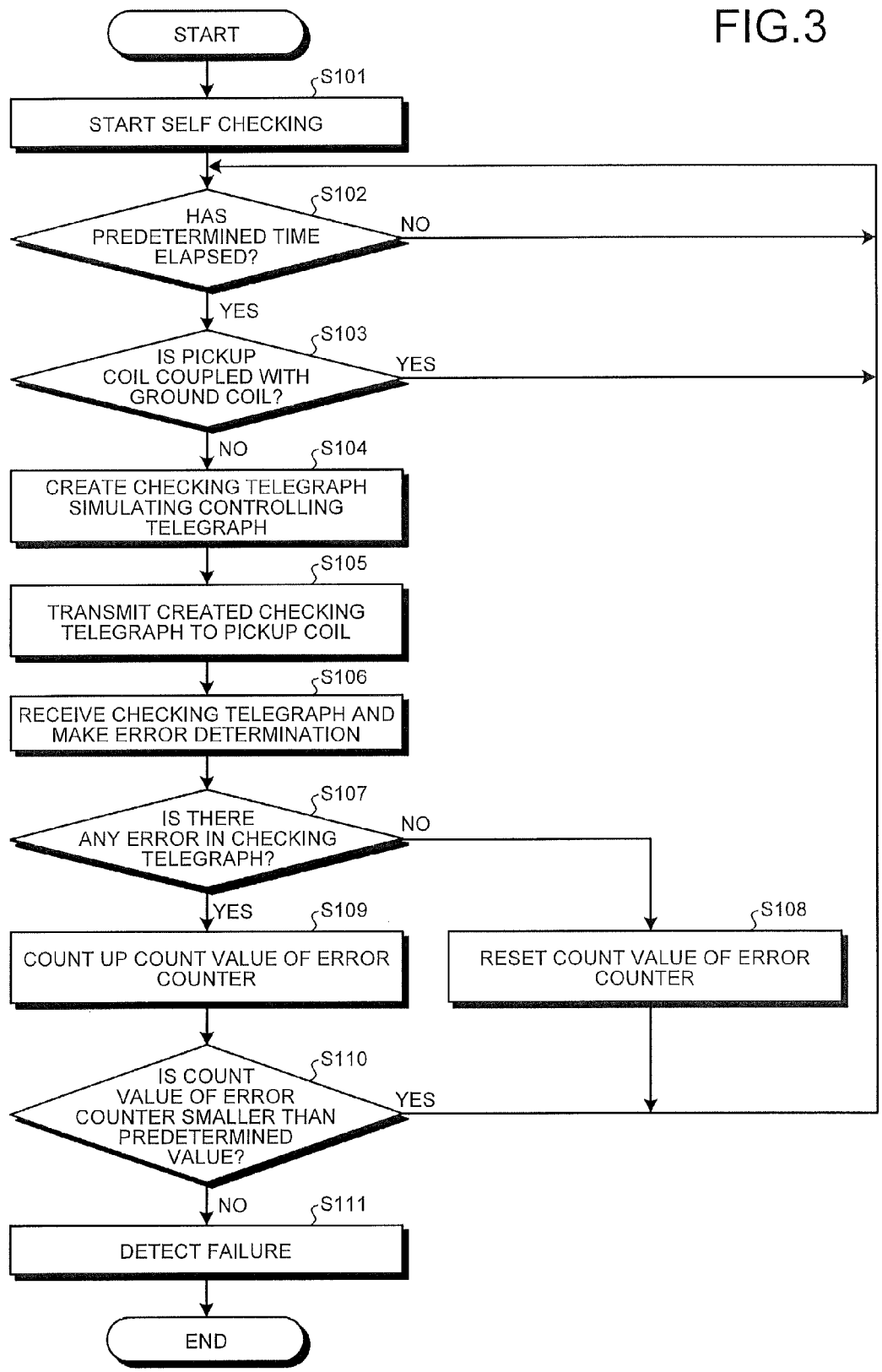

ON-BOARD TRANSPONDER DEVICE AND METHOD OF VERIFYING SOUNDNESS THEREOF

FIELD

The present invention relates to an on-board transponder device that transmits and receives necessary telegraph information to and from a ground device via a pickup coil and a ground coil coupled with the pickup coil, and to a method of verifying soundness of the on-board transponder device.

BACKGROUND

A train safety device including the on-board transponder device mentioned above is a device that transmits and receives a telegraph (a digital telegraph) between a ground device and an on-board device on a train side and execute train control according to contents described in the telegraph. In view of executing train control safely, the train safety device is required to reliably transmit a correct telegraph.

As a conventional device of this type, a train safety device is described in Patent Literature 1 mentioned below, for example (disclosed as "train control system" in Patent Literature 1). In the train safety device, a telegraph including a specific number allocated to a route from a certain stopping station from which a train starts to another stopping station different from the certain stopping station, and at which the train arrives, is transmitted mutually between an on-board device and a ground device to detect a stuck failure (also called "sticking failure") that occurs due to a memory error or the like in respective processors, such as a transmission/reception device, interposed on a transmission line.

CITATION LIST

Patent Literature

Patent Literature 1: Japanese Patent Application Laid-open No. 2008-105477

SUMMARY

Technical Problem

However, in the conventional technique mentioned above, unless a ground coil and a pickup coil are coupled and communicate with each other, an occurrence of a sticking failure in the on-board transponder device cannot be determined. Therefore, the conventional technique has a problem that a determination of an occurrence of a sticking failure cannot be made while a train is stopped, or even when the determination can be made while the train is stopped, the train has to be moved to a location of the ground coil. In addition, the determining process cannot be performed unless an actual telegraph is received, and consequently a determination of an occurrence of a sticking failure cannot be made quickly and accurately.

The present invention has been achieved to solve the above problems, and an object of the present invention is to provide an on-board transponder device that enables a quick and accurate determination of an occurrence of sticking failure, and a method of verifying soundness of the on-board transponder device.

Solution to Problem

In order to solve the aforementioned problems, an on-board transponder device that is applied to a train safety system, and transmits and receives a controlling telegraph used for train running control to and from a ground device via a ground coil coupled with a pickup coil is configured such that it includes: a signal transmission unit that creates a checking telegraph that is different from the controlling telegraph and transmits the created checking telegraph to the pickup coil; a signal reception unit that receives the checking telegraph via the pickup coil and restores the telegraph information from the received checking telegraph; and a communication controller that creates telegraph information to be included in the checking telegraph, outputs the telegraph information to the signal transmission unit, receives telegraph information restored by the signal reception unit, and verifies a telegraph reception function on an on-board side based on a result of a comparison between transmission telegraph information included in a checking telegraph transmitted from the signal transmission unit and reception telegraph information restored from a checking telegraph that includes the transmission telegraph information.

Advantageous Effects of Invention

The on-board transponder device according to the present invention can quickly and accurately determine an occurrence of a sticking failure.

BRIEF DESCRIPTION OF DRAWINGS

FIG. 3 is a flowchart for explaining a self-checking process flow in the on-board-side communication device according to the embodiment.

DESCRIPTION OF EMBODIMENTS

Exemplary embodiments of an on-board transponder device and a method of verifying soundness of the on-board transponder device according to the present invention will be explained below in detail with reference to the accompanying drawings. The present invention is not limited to the following embodiment.

Embodiment

Figure 1:
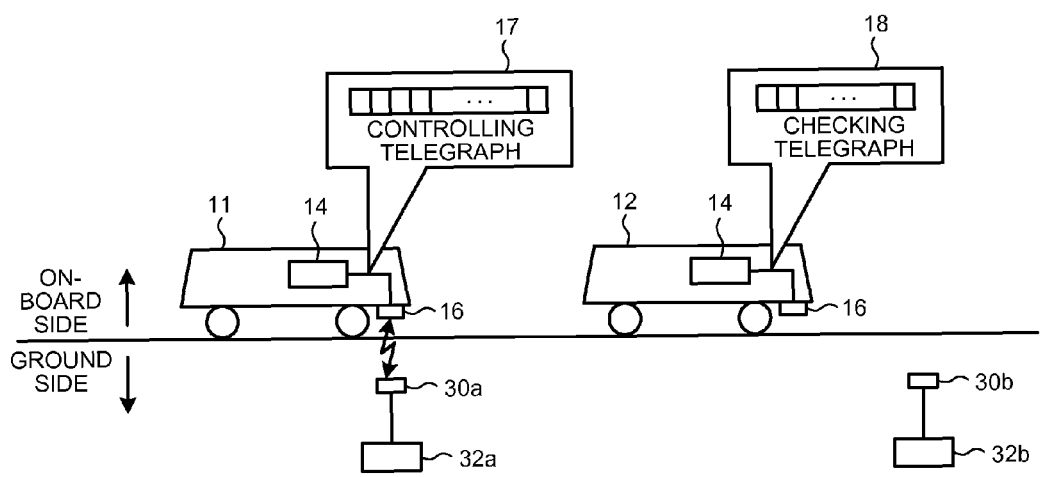
FIG. 1 is an explanatory diagram of a schematic configuration and a schematic operation of a train safety system including an on-board transponder device according to an embodiment of the present invention.

FIG. 1 is an explanatory diagram of a schematic configuration and a schematic operation of a train safety system including an on-board transponder device according to an embodiment of the present invention. As shown in FIG. 1, the train safety system including the on-board transponder device according to the present embodiment is configured to include an on-board-side communication device 14 and a pickup coil 16 that are mounted on a train 11 (or a train 12) and a ground coil 30 (30a, 30b) and a ground-side communication device 32 (32a, 32b) that are installed on a ground side. Among these constituent elements, the on-board-side communication device 14 and the pickup coil 16 constitute the on-board transponder device, and the ground coil 30 and the ground-side communication device 32 constitute a ground transponder device. To simplify the following descriptions, the on-board transponder device and the ground transponder device are referred to as "on-board device" and "ground device", respectively.

FIG. 1 depicts the train 11 in a state where the pickup coil 16 is coupled with the ground coil 30a. When the pickup coil 16 is coupled with the ground coil 30a, a controlling telegraph 17 is transmitted and received between the on-board device of the train 11 and the ground device. The controlling telegraph 17 is a telegraph created by both the on-board device and the ground device. The controlling telegraph 17 created by the on-board device includes train information such as train type, train formation number, and operation number. The controlling telegraph 17 created by the ground device includes elements such as location information, speed limit, and gradient information.

On the other hand, FIG. 1 shows the train 12 in a state where the pickup coil 16 is not coupled with the ground coil 30a or the ground coil 30b. The on-board device according to the present embodiment utilizes the state where the pickup coil 16 is not coupled with the ground coil 30, as shown in the train 12 in FIG. 1, to cause the on-board-side communication device 14 to create a checking telegraph 18 that is different from the controlling telegraph 17 in order to quickly and accurately determine an occurrence of a sticking failure in the on-board-side communication device 14 itself.

In the present embodiment, a sticking failure that occurs in the on-board device includes not only a fault (failure) in which each time the on-board device transmits a telegraph, the telegraph includes the same information due to a memory error (including memory errors that occur on both a transmission side and a reception side) or the like in the on-board device, but also a fault (failure) in which only the same telegraph signal is output due to a cause other than a memory error (for example, a fault of a transmission system in a modulator or the like).

Figure 2:
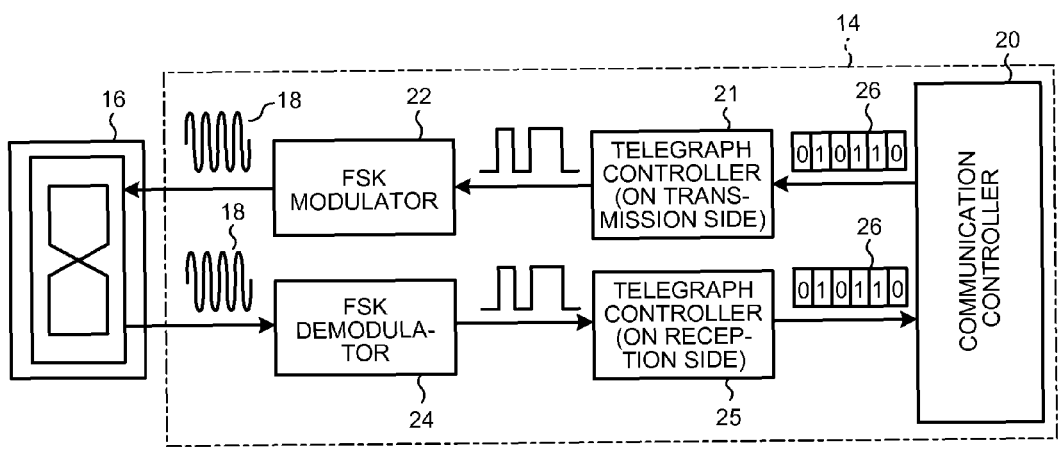
FIG. 2 is a functional block diagram of an internal configuration of an on-board-side communication device according to the embodiment.

FIG. 2 is a functional block diagram of an internal configuration of the on-board-side communication device 14. In FIG. 2, the on-board-side communication device 14 is configured to include a communication controller 20 that creates telegraph information 26 as information to be included in the checking telegraph 18, a telegraph controller (on the transmission side) 21 that converts the telegraph information 26 into a binary signal, for example, and outputs the binary signal, an FSK modulator 22 that outputs an FSK-modulated signal, for example, generated from the signal input from the telegraph controller (on the transmission side) 21 as the checking telegraph 18, an FSK demodulator 24 that receives the FSK-modulated signal (the checking telegraph 18) transmitted from the FSK modulator 22 via the pickup coil 16 connected to the on-board-side communication device 14 and demodulates the received FSK-modulated signal, and a telegraph controller (on the reception side) 25 that creates (restores) the checking telegraph 18 by using the demodulated signal input from the FSK demodulator 24 and outputs the restored checking telegraph 18 to the communication controller 20.

In the above configuration, the telegraph controller (on the transmission side) 21 and the FSK modulator 22 constitute a signal transmission unit in the on-board transponder device, and the FSK demodulator 24 and the telegraph controller (on the reception side) 25 constitute a signal reception unit in the on-board transponder device.

According to the on-board transponder device of the present embodiment configured as described above, the telegraph controller (on the transmission side) 21 and the FSK modulator 22, which serve as the signal transmission unit in the on-board-side communication device 14 and the FSK demodulator 24 and the telegraph controller (on the reception side) 25, which serve as the signal reception unit in the on-board-side communication device 14 constitute a feedback circuit via the pickup coil 16. The communication controller 20 decides the checking telegraph 18 to be transmitted and performs a process of checking whether there is an error in the received checking telegraph 18, that is, a process of verifying soundness of a telegraph (a controlling telegraph) to be received from the ground device.

An operation of the on-board device (the on-board-side communication device 14) according to the present embodiment is explained next with reference to FIGS. 2 and 3. FIG. 3 is a flowchart for explaining a self-checking process flow in the on-board-side communication device 14.

First, the self-checking process in the on-board-side communication device 14 starts when a power source is turned on (Step S101). The on-board-side communication device 14 determines whether a predetermined time has elapsed since the last transmission of a checking telegraph (Step S102). When a predetermined time has not elapsed (NO at Step S102), the determining process at Step S102 is repeated. When a predetermined time has elapsed (YES at Step S102), whether the pickup coil 16 is coupled with the ground coil 30 is determined (Step S103). When the pickup coil 16 is coupled with the ground coil 30 (YES at Step S103), the processes at Steps S102 and S103 are repeated. On the other hand, when the pickup coil 16 is not coupled with the ground coil 30 (NO at Step S103), a checking telegraph simulating a controlling telegraph is created (Step S104) and the created checking telegraph is transmitted to the pickup coil 16 (Step S105).

The on-board-side communication device 14 receives the checking telegraph through the feedback circuit constituted via the pickup coil 16 and determines whether there is an error in the received checking telegraph (Step S106). As means for performing the error determining process, an error counter can be used, for example. When there is no error in the checking telegraph (NO at Step S107), a count value of the error counter is reset (Step S108) and the process shifts to Step S102. On the other hand, when there is an error in the checking telegraph (YES at Step S107), a count value of the error counter is counted up (Step S109), and then it is determined whether the count value of the error counter is smaller than a predetermined value (Step S110). When the count value of the error counter is smaller than a predetermined value (YES at Step S110), the process shifts to Step S102 as in the case of no error in the checking telegraph. When the count value of the error counter is equal to or larger than a predetermined value (NO at Step S110), a failure in the on-board device is detected and the self-checking process flow is finished (Step S111). That is, in the processes at Steps S107 to S111, when an error in the checking telegraph is consecutively determined to be present for a predetermined value (a predetermined number of times), the on-board device is determined to have a failure. In this sense, the predetermined value mentioned above can be an integer equal to or larger than 2.

At Step S104 described above, for example, a process of incrementing the contents of the checking telegraph is performed. That is, a checking telegraph with different contents is created each time the checking telegraph is transmitted.

Because the checking telegraph is a telegraph simulating a controlling telegraph, basically, no checking telegraph is output when the pickup coil 16 is coupled with the ground coil 30. However, it is also conceivable that immediately after determining that the pickup coil 16 is not coupled with the ground coil 30 at Step S103, this state is changed to a state where the pickup coil 16 is coupled with the ground coil 30.

When the pickup coil 16 is coupled with the ground coil 30, the on-board device is in a state where a checking telegraph and a controlling telegraph are simultaneously received (in a so-called "interference state"). Consequently, there is a possibility that neither the checking telegraph nor the controlling telegraph is received properly. However, because in a process of receiving a controlling telegraph, telegraph transfer is performed several times usually when the pickup coil 16 is coupled with the ground coil 30, and also the contents of the telegraph are verified by performing a matching process a plurality of number of times, the contents of the received checking telegraph can be recognized properly.

Even when the pickup coil 16 is coupled with the ground coil 30 and the on-board device is in an interference state, the process of determining whether the pickup coil 16 is coupled with the ground coil 30 is performed after a predetermined time has elapsed, and when the pickup coil 16 is not coupled with the ground coil 30, a checking telegraph is transmitted (Steps S102 and S103). Therefore, in a case that the on-board device operates normally, although the on-board device is determined to operate abnormally in a first determining process, for example at the time of the interference state, the on-board device can be properly determined to operate normally in a second determining process. In this sense, the above predetermined time, that is, a transmission interval of a checking telegraph when the pickup coil 16 is not coupled with the ground coil 30 can be set to any arbitrary time longer than a time where the pickup coil 16 is coupled with the ground coil 30 during normal running of the train, for example.

While the on-board transponder device according to the embodiment of the present invention has been explained with reference to FIGS. 1 to 3, the scope of the present invention is not limited to the contents disclosed above, and various changes can be made without departing from the scope of the present invention.

For example, in FIG. 2, the FSK modulator 22 and the FSK demodulator 24 that respectively serve as a modulator and a demodulator in the on-board-side communication device 14 are disclosed. However, the modulator and the demodulator can also utilize other modulation/demodulation methods.

In the above descriptions, the checking telegraph has been explained as a telegraph simulating a controlling telegraph. However, the checking telegraph is not necessarily a telegraph simulating a controlling telegraph. An essential point is that each time a checking telegraph is created, contents of the checking telegraph are updated in any manner. For example, even when the contents of the checking telegraph are changed only by one bit value, a sticking failure can be detected.

As described above, the on-board transponder device and the method of verifying soundness of the on-board transponder device according to the present embodiment can verify soundness of the ground-side communication device by only using a device on the on-board side without using any facility on the ground side, that is, without using the ground-side communication device and the ground coil. Accordingly, unlike the conventional device described in Patent Literature 1, which enables a determination of an occurrence of a sticking failure only when the pickup coil is coupled with the ground coil, a determination of an occurrence of a sticking failure can be made at any arbitrary point of time, regardless of whether a train is running or in a standstill state, by only turning the power source of the on-board-side communication device on, that is, turning a power source of the train on, thereby enabling a quick and accurate determination of an occurrence of a sticking failure. Therefore, by adopting test details described above as daily start-up inspection items for the train, for example, a failure can be found before the train starts running.

In addition, the on-board transponder device and the method of verifying soundness of the on-board transponder device according to the present embodiment can verify not only a sticking failure, but also soundness of a communication function (for example, a filter circuit) in the on-board device, because the signal transmission unit (the telegraph controller (on the transmission side) and the FSK modulator) in the on-board device and the signal reception unit (the telegraph controller (on the reception side) and the FSK demodulator) in the on-board device constitute a feedback circuit via a pickup coil.

INDUSTRIAL APPLICABILITY

As described above, the on-board transponder device according to the present invention is useful as an invention that can quickly and accurately determine an occurrence of a sticking failure.

REFERENCE SIGNS LIST 11, 12 TRAIN
14 ON-BOARD-SIDE COMMUNICATION DEVICE
16 PICKUP COIL
17 CONTROLLING TELEGRAPH
18 CHECKING TELEGRAPH
20 COMMUNICATION CONTROLLER
21 TELEGRAPH CONTROLLER (ON TRANSMISSION SIDE)
22 FSK MODULATOR
24 FSK DEMODULATOR
25 TELEGRAPH CONTROLLER (ON RECEPTION SIDE)
26 TELEGRAPH INFORMATION
30, 30a, 30b GROUND COIL
32 GROUND-SIDE COMMUNICATION DEVICE

The invention claimed is:
1. An on-board transponder device that is applied to a train safety system, and transmits and receives a controlling telegraph used for train running control to and from a ground device via a ground coil coupled with a pickup coil, the on-board transponder device comprising:
a signal transmission unit that creates a checking telegraph that is different from the controlling telegraph and transmits the created checking telegraph to the pickup coil;
a signal reception unit that receives the checking telegraph via the pickup coil and restores the telegraph information from the received checking telegraph; and
a communication controller that creates telegraph information to be included in the checking telegraph, outputs the telegraph information to the signal transmission unit, receives telegraph information restored by the signal reception unit, and verifies a telegraph reception function on an on-board side based on a result of a comparison between transmission telegraph information included in a checking telegraph transmitted from the signal transmission unit and reception telegraph information restored from a checking telegraph that includes the transmission telegraph information, wherein
the communication controller changes telegraph information to be included in the checking telegraph each time the checking telegraph is transmitted.

2. The on-board transponder device according to claim 1, wherein the signal transmission unit transmits the checking telegraph to the pickup coil during a period in which the pickup coil is not coupled with the ground coil.

3. The on-board transponder device according to claim 1, wherein the communication controller determines that the on-board transponder device has a failure when an error in the received checking telegraph is consecutively detected for a predetermined number of times or more.

4. The on-board transponder device according to claim 1, wherein a transmission interval for transmitting a checking telegraph from the signal transmission unit at a non-coupling state in which the pickup coil is not coupled with the ground coil is set to a time longer than a time during which the pickup coil is coupled with the ground coil during normal running of the train.

5. A method of confirming soundness of an on-board transponder device applied to a train safety system, the method comprising:
- a first step of creating necessary telegraph information for creating a checking telegraph that is different from a controlling telegraph used for train running control;
- a second step of creating the checking telegraph by using the telegraph information;
- a third step of transmitting the created checking telegraph to the pickup coil during a period in which the pickup coil is not coupled with the ground coil;
- a fourth step of receiving the checking telegraph via the pickup coil;
- a fifth step of restoring the telegraph information from the received checking telegraph; and
- a sixth step of verifying a telegraph reception function at an on-board side based on a result of a comparison between transmission telegraph information included in a transmitted checking telegraph and reception telegraph information restored from a checking telegraph that includes the transmission telegraph information, wherein
- at the second step, telegraph information to be included in the checking telegraph is changed each time the checking telegraph is created.

6. The method of confirming soundness of an on-board transponder device according to claim 5, wherein at the sixth step, an on-board transponder device is determined to have a failure when an error in the received checking telegraph is consecutively detected for a predetermined number of times or more.

7. An on-board transponder device that is applied to a train safety system, and transmits and receives a controlling telegraph used for train running control to and from a ground device via a ground coil coupled with a pickup coil, the on-board transponder device comprising:
- a signal transmission unit that creates a checking telegraph that is different from the controlling telegraph and transmits the created checking telegraph to the pickup coil;
- a signal reception unit that receives the checking telegraph via the pickup coil and restores telegraph information from the received checking telegraph; and
- a communication controller that creates telegraph information to be included in the checking telegraph, outputs the telegraph information to the signal transmission unit, receives telegraph information restored by the signal reception unit, and confirms a telegraph reception function on an on-board side based on a result of a comparison between transmission telegraph information included in a checking telegraph transmitted from the signal transmission unit and reception telegraph information restored from a checking telegraph that includes the transmission telegraph information, wherein
- a transmission interval for transmitting a checking telegraph from the signal transmission unit at a time of non-coupling in which the pickup coil is not coupled with the ground coil is set to a time longer than a time where the pickup coil is coupled with the ground coil during normal running of the train, wherein
- a transmission interval for transmitting a checking telegraph from the signal transmission unit at a non-coupled state in which the pickup coil is not coupled with the ground coil is set to a time longer than a time during which the pickup coil is coupled with the ground coil during normal running of the train.

8. The on-board transponder device according to claim 7, wherein the signal transmission unit transmits the checking telegraph to the pickup coil during a period in which the pickup coil is not coupled with the ground coil.

9. The on-board transponder device according to claim 7, wherein the communication controller determines that the on-board transponder device has a failure when an error in the received checking telegraph is consecutively detected for a predetermined number of times or more.

* * * * *